(12) United States Patent
Matsushita

(10) Patent No.: US 6,378,876 B1
(45) Date of Patent: Apr. 30, 2002

(54) METAL GASKET ASSEMBLY FOR CYLINDER HEAD

(75) Inventor: Yoshitaka Matsushita, Saitama Pref. (JP)

(73) Assignee: Nippon Leakless Industry Co., Ltd., Tokyo (JP)

( * ) Notice: Subject to any disclaimer, the term of this patent is extended or adjusted under 35 U.S.C. 154(b) by 1 days.

(21) Appl. No.: 09/690,726

(22) Filed: Oct. 18, 2000

(30) Foreign Application Priority Data

Oct. 20, 1999 (JP) .......................................... 11-298610

(51) Int. Cl.$^7$ ............................................... F02F 11/00
(52) U.S. Cl. ........................................ 277/593; 277/595
(58) Field of Search ................................ 277/593, 592, 277/594, 595

(56) References Cited

U.S. PATENT DOCUMENTS

| | | | |
|---|---|---|---|
| 4,791,891 A | * 12/1988 | Kubis et al. | ............. 123/41.84 |
| 4,976,445 A | * 12/1990 | Udagawa | |
| 4,995,624 A | * 2/1991 | Udagawa et al. | |
| 5,240,262 A | * 8/1993 | Udagawa et al. | |
| 5,286,039 A | * 2/1994 | Kawaguchi et al. | |
| 5,348,315 A | * 9/1994 | Kawaguchi et al. | |
| 5,427,388 A | * 6/1995 | Ueta | |
| 5,895,054 A | * 4/1999 | Miyaoh et al. | ............. 277/595 |
| 5,927,724 A | * 7/1999 | Maschmann et al. | ....... 277/593 |
| 6,135,459 A | * 10/2000 | Hiramatsu et al. | .......... 277/593 |

* cited by examiner

Primary Examiner—Anthony Knight
Assistant Examiner—Alison K. Pickard
(74) Attorney, Agent, or Firm—Young & Thompson

(57) ABSTRACT

A metal gasket assembly comprises a metal main plate, a metal auxiliary plate lapped with the main plate, the main plate including cylinder openings formed at positions corresponding to cylinder bores in a cylinder block of an internal combustion engine, annular beads formed around the cylinder openings and having a cross-sectional shape of 'V', a plurality of coolant holes formed in the peripheral parts of the annular beads, an outer peripheral bead formed at a position where it entirely surrounds the annular beads and the plurality of coolant holes, and having a slope cross-sectional shape, while the auxiliary plate including cylinder openings formed corresponding to the cylinder openings in the main plate, fold-over parts formed around the auxiliary plate cylinder openings and fold-over in a direction reverse to the direction toward the main plate, and having a width with which they are vertically lapped at least with the entire 'V' shape of the annular beads on the main plate, annular beads formed in the fold-over parts so as to be opposed to the annular beads on the main plate and projected in a direction reverse to the direction of the projection of the main plate annular beads, and having a cross-sectional shape of 'V', a plurality of coolant holes formed corresponding to the plurality of coolant holes in the main plate, and an outer peripheral bead opposed to the main plate outer peripheral bead and inclined in a direction reverse to the inclined direction of the main plate outer peripheral bead, and the width of the fold-over parts of the auxiliary plate being equal to or smaller than the thickness of sleeves which are fitted in sleeve fitting holes in the cylinder block and which define the cylinder bores.

3 Claims, 4 Drawing Sheets

METAL GASKET ASSEMBLY FOR CYLINDER HEAD

BACKGROUND OF THE INVENTION

1. Field of the Invention

The present invention relates to a metal gasket assembly for a cylinder head, which is interposed between a cylinder block and a cylinder head of an internal combustion engine.

2. Related Art

For example, as disclosed in Japanese Utility Model Laid-Open No. H4-71865, a metal gasket assembly for a cylinder head has been conventionally known, having a structure shown in FIG. 4. This conventional metal gasket assembly 1 comprises a metal main plate 2 and a metal auxiliary plate 3, and a metal surface pressure adjusting plate 4. The main plate 2 is formed therein with main plate cylinder openings 2a in positions corresponding to cylinder bores of a cylinder block of an internal combustion engine, main plate annular beads 2b formed around the main plate cylinder openings 2a, being projected downward, and having a cross-sectional shape of 'V' (the so-called full bead shape), and a main plate outer peripheral bead 2c formed so as to entirely surround the main plate annular beads 2b and a plurality of not shown coolant holes formed in the peripheral parts of the main plate annular beads 2b, and having a cross-sectional shape of slope (the so-called half bead shape). The auxiliary plate 3 comprises auxiliary plate cylinder openings 3a formed at positions corresponding to the main plate cylinder openings 2a, fold-over parts 3b which are folded around the peripheral edges of the auxiliary plate cylinder openings 3a in the auxiliary plate 3 in a direction toward the main plate 2, and which have a width with which the fold-over parts 3b are vertically lapped with the entire 'V' cross-sectional shape of the main plate annular beads 2b on the main plate 2, and a plurality of not shown auxiliary plate coolant holes formed corresponding to the above-mentioned main plate coolant holes in the main plate 2. The auxiliary plate 3 is entirely formed into a flat shape having no beads so as to be lapped below the above-mentioned main plate 2. Further, the above-mentioned surface pressure adjusting plate 4 has a planer shape corresponding to that of the auxiliary plate 3, except the above-mentioned fold-over parts 3b, and is interposed between the auxiliary plate 3 and the main plate 2, the thickness of the surface pressure adjusting plate 4 being thinner than that of the auxiliary plate 3 in the part which excludes that of the fold-over parts 3b.

The above-mentioned conventional cylinder head metal gasket assembly 1 is interposed between a cylinder block 5 and a cylinder head 6 in an internal combustion engine, as shown in FIG. 4, and is fastened so that the main plate annular beads 2b formed around the main plate cylinder openings 2a corresponding to the cylinder bores 5a in the cylinder block 5 can prevent combustion gas in combustion chambers defined by the cylinder bores 5a in the cylinder block 5, recessed parts 6a in the cylinder head 6 opposed to the cylinder bores and the top parts of not shown pistons in the cylinder bores 5a, from blowing to the outside, and the main plate outer peripheral bead 2c entirely surrounding the above-mentioned plurality of main plate coolant holes corresponding to not shown coolant passages which are formed in the cylinder block 5 and the cylinder head 6 and mutually communicated, can prevent coolant from leaking.

Further, in the cylinder head metal gasket assembly 1, the auxiliary plate 3 is formed with the fold-over parts 3b at positions corresponding to the main plate annular beads 2b on the main plate 2 so as to increase the thickness of the auxiliary plate 3, and meanwhile, the surface pressure adjusting plate 4 which is thinner than the auxiliary plate 3 is lapped with the auxiliary plate 3, except the positions corresponding to the main plate annular beads 2b on the main plate 2, so as to adjust the distribution of the surface pressures between the main plate annular beads 2b and parts other than the beads 2b in order to enhance the sealing function.

In the meantime, these years, engines made of aluminum alloy have been prosperously used in order to save fuel consumption due to reduction in the weight of a vehicle, and accordingly, cylinder blocks made of aluminum alloy have been frequently used. Further, in the case of an cylinder block made of aluminum alloy, as shown in FIG. 4, there haven been frequency used the following measures, that is, sleeve fitting holes 5b having a size which is much greater than that of the inherent cylinder bores are formed in the cylinder block 5 at positions where the cylinder bores are to be formed, and cast iron sleeves 7 having high lubricity are press-fitted in the sleeve fitting holes 5b so as to define the cylinder bores 5a in the cast iron sleeves 7 in order to aim at preventing abrasion of the inner wall surfaces of the cylinders and seizure of the pistons. These sleeves 7 are pressed by reaction force when the metal gasket assembly 1 is fastened between the cylinder block 5 and the cylinder head 6, and accordingly, tends to be slightly depressed from the upper end surface of the cylinder bock 5, as indicated by a degree t of depression shown in the figure.

However, in the above-mentioned metal gasket assembly 1, if the width of the fold-over parts 3b in the auxiliary plate 3 is greater than the thickness of the cast iron sleeves 7, the fold-over parts 3b of the auxiliary plate 3 extend up to positions above the upper end surface of the cylinder bock 5, exceeding the cast iron sleeves 7, and accordingly, if the cast iron sleeves 7 are depressed as mentioned above so as to define a difference in height between the upper end surface of the cylinder block 5 and the upper end faces of the cast iron sleeves 7, the fold-over parts 3b cannot cope with the difference in height, resulting in that the fold-over parts 3b of the auxiliary plate 3 are caught between the upper end surface of thee cylinder block 5 and the lower end surface of the cylinder head 6. Thus, the fold-over parts 3b hinders the metal gasket assembly 1 from being sufficiently fastened, and accordingly, there has been raised such a problem that the main plate annular beads 2b of the main plate 2 cannot be sufficiently fastened between the upper surface of the cast iron sleeves 7 and the lower end surface of the cylinder head 6 so that no high sealing function can be obtained.

Further, in the above-mentioned metal gasket assembly 1, the above-mentioned fold-over parts 3b faces toward not to the cast iron sleeves 7 but the main plate 2, and the flat part of the auxiliary plate 3 faces toward the cylinder block 5 and the upper end surfaces of the cast iron sleeves 7, and accordingly, even though the width of the fold-over parts 3b is decreased so that the fold-over parts 3b are prevented from overlapping the upper end surface of the cylinder block 5, the main plate annular beads 2b of the main plate 2 cannot be fastened on the upper surfaces of the cast iron sleeves 7 unless the flat part of the auxiliary plate 3 is deformed into a half bead-like shape. Incidentally, the surface pressure adjusting plate 4 is also caught between the upper surface of the cylinder block 5 and the lower surface of the cylinder head 6 so as to hinder the main plate annular beads 2b from being sufficiently fastened on the upper end surfaces of the cast iron sleeves 7. Accordingly, there has been raised such a problem that the main plate annular beads 2b cannot be sufficiently fastened so that no high sealing function cannot be obtained.

SUMMARY OF THE INVENTION

An object of the present invention is to provide a metal gasket assembly which can advantageously solve the above-mentioned problems, and accordingly, the metal gasket assembly according to the present invention, comprises a metal main plate, and a metal auxiliary plate mutually lapped with the main plate, the main plate including main cylinder openings formed at positions corresponding to cylinder bores in a cylinder block of an internal combustion engine, main plate annular beads formed around the main plate cylinder openings and having a cross-sectional shape of 'V', a plurality of main plate coolant holes formed in the peripheral parts of the main plate annular beads, a main plate outer peripheral bead formed at a position where it entirely surrounds the main plate annular beads and the plurality of main plate coolant holes, and having a cross-sectional shape of slope, while the auxiliary plate including auxiliary plate cylinder openings formed corresponding to the main plate cylinder openings in the main plate, fold-over parts formed around the auxiliary plate cylinder openings and folded in a direction reverse to the direction toward the main plate, and having a width with which they are vertically lapped at least with the entire 'V' shape of the main plate annular beads on the main plate, auxiliary plate annular beads formed in the fold-over parts so as to be opposed to the main plate annular beads on the main plate and projected in a direction reverse to the direction of the projection of the main plate annular beads, and having a cross-sectional shape of 'V', a plurality of auxiliary plate coolant holes formed corresponding to the plurality of main plate coolant holes in the main plate, and an auxiliary plate outer peripheral bead opposed to the main plate outer peripheral bead and inclined in a direction reverse to the inclined direction of the main plate outer peripheral bead, and the width of the fold-over parts of the auxiliary plate being equal to or smaller than the thickness of sleeves which are fitted in sleeve fitting holes in the cylinder block and which define the cylinder bores.

In the above-mentioned metal gasket assembly which is interposed between a cylinder block and a cylinder head in an internal combustion engine, the main plate annular beads around the main plate cylinder openings corresponding to the cylinder bores in the cylinder block and having the 'V' cross-sectional shape, and the auxiliary plate annular beads opposed to the main plate annular beads, projected in a direction reverse to the projecting direction of the main plate annular beads, and having the slope cross-sectional shape, can prevent combustion gas in combustion chambers defined by the cylinder bores in the cylinder block, recessed parts in the cylinder head opposed to the cylinder bores, and top parts of pistons in the cylinder bores, from blowing to the outside, and the main plate outer peripheral bead entirely surrounding the plurality of main plate coolant holes corresponding to coolant passages formed in the cylinder bock and the cylinder head and mutually communicated, and the auxiliary plate outer peripheral bead formed corresponding to the main plate outer peripheral bead and entirely surrounding the plurality of auxiliary plate coolant holes formed corresponding to the plurality of main plate coolant holes, can prevent coolant from leaking.

Further, in the cylinder head metal gasket assembly, the auxiliary plate fold-over parts having a width with which they are lapped with the entire 'V' shape of the main plate annular beads on the main plate increases the thickness of the auxiliary plate at positions corresponding to the main plate annular beads, while the auxiliary plate annular beads in the fold-over parts in the auxiliary plate are lapped with the main plate annular beads and are fastened therewith so that the distribution of the surface pressure between the main plate annular beads and the parts other than the beads can be suitably adjusted, thereby it is possible to enhance the sealing function of the main plate annular beads, and to allow the auxiliary plate annular beads to exhibit a high sealing function.

Accordingly, with the cylinder head metal gasket assembly, the sealing functions of the main plate outer peripheral bead and the auxiliary plate outer peripheral bead can be ensured so as to prevent coolant from leaking while the sealing functions of the main plate annular beads and the auxiliary plate annular beads can be enhanced so as to effectively prevent combustion gas in the combustion chamber from blowing out.

Further, in the cylinder head metal gasket assembly, the auxiliary plate fold-over parts are formed being folded in a direction reverse to the direction toward the main plate, and the width of the fold-over parts is equal to or smaller than the thickness of the sleeves fitted in the sleeve fitting holes in the cylinder block and defining the cylinder bore. Accordingly, since the fold-over parts in the auxiliary plate are prevented from being caught between the upper end surface of the cylinder block and the lower end surface of the cylinder head when the metal gasket assembly being interposed and fastened between the upper end surface of the cylinder block and the lower end surface of the cylinder head, but are positioned being opposed to the upper end surfaces of the sleeves, the fold-over parts does not cause the fastening of the metal gasket on the upper end surfaces of the sleeves to be hindered, and the flat part of the auxiliary plate to be forcibly deformed by a difference in height between the upper end surface of the cylinder block and the upper end surface of the sleeves so as to hinder the fastening of the metal gasket assembly on the upper end surfaces of the sleeve, even though the sleeves are depressed.

Accordingly, with this cylinder head metal gasket assembly, the sealing functions of the main plate annular beads and the auxiliary plate annular beads can be sufficiently enhanced so as to surely prevent combustion gas from blowing out from the combustion chamber even thought the sleeves are depressed.

It is noted that, according to the present invention, the width of the auxiliary plate annular beads may be set to be equal to or smaller than that of the main plate annular beads, and with the auxiliary plate annular beads having such a smaller widths, the slope of the beads is steeper than that of the auxiliary plate annular beads having a height and a width which are equal to those of the main plate annular beads so that the auxiliary plate annular beads can hardly be depressed, thereby it is possible to further enhance the sealing functions of the main plate annular beads and the auxiliary plate annular beads.

Further, according to the present invention, the height of the auxiliary plate annular beads may be set to be equal to or higher than that of the main plate annular beads, and with the auxiliary plate annular beads having such a higher height, the slope of the beads is steeper than that of the auxiliary plate annular beads having a height and a width which are equal to those of the main plate annular beads so that they can hardly be depressed, thereby it is possible to further enhance the sealing functions of the main plate annular beads and the auxiliary plate annular beads.

DETAILED DESCRIPTION OF THE PREFERRED EMBODIMENTS

Figure 4:
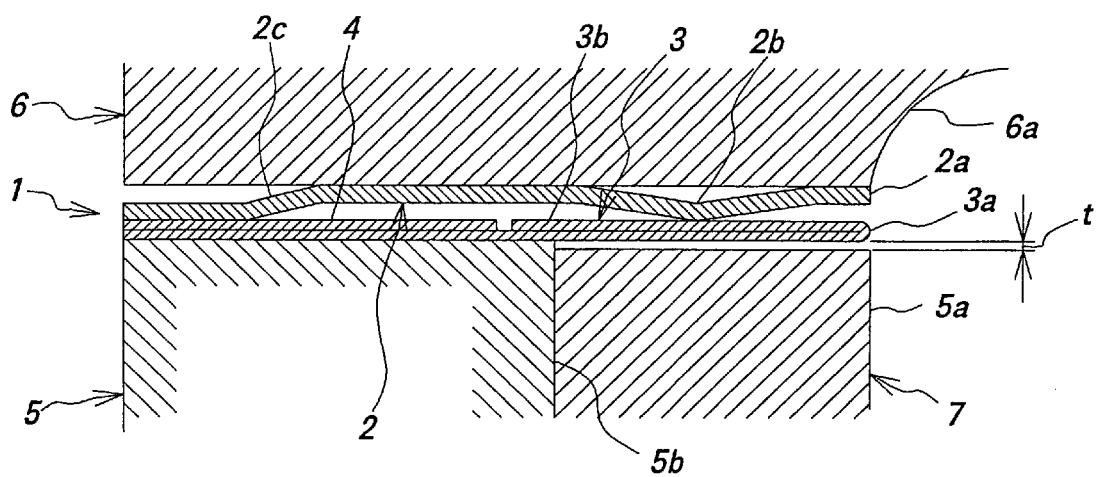
FIG. 4 is a sectional view illustrating the arrangement of a conventional metal gasket for a cylinder head at a position similar to the position along the line A—A in FIG. 2.

Preferred embodiments according to the present invention will be described below with reference to the accompanying drawings, wherein parts similar to that in FIG. 4 are referenced with the same reference numerals as that in FIG. 4.

A metal gasket 1 of the first embodiment comprises a metal main plate 2, and a metal auxiliary plate 3 lapped with the main plate 2, and specifically, the main plate 2 is made of a SUS-301H stainless steel material used for a main plate in a usual metal gasket assembly, and the auxiliary plate 3 is made of a stainless steel material such as SUS-304, SUS-310S or SUS-430 which is usually used for an auxiliary plate in a usual metal gasket assembly having grommets and which has a degree of elongation greater than that of the stainless material for the main plate so that fold-over parts can be easily formed without defects. The main plate 2 in the metal gasket assembly 1 in this embodiment comprises, as shown in the FIGS. 1, 2, main plate cylinder openings 2a formed at positions corresponding to three bores in the cylinder block of a gasoline engine as an internal combustion engine, main plate annular beads 2b formed around the main plate cylinder openings 2a, being downward projected in this embodiment, and having a cross-sectional shape of 'V' (the so-called full bead shape), a plurality of main plate coolant holes 2d formed in the peripheral parts of the main plate annular beads 2b, and a main plate outer peripheral bead 2c formed so as to entirely surround three annular beads 2b and the plurality of coolant holes 2d in the peripheral parts thereof and having a cross-sectional shape of slope (the so-called half bead shape), which is lowered outward (leftward in the figure) of the gasket assembly in this embodiment, and further has main plate bolt holes 2e, for cylinder head mounting bolts, main plate lubrication oil holes 2f for circulating engine lubrication oil and the like. It is noted the front end parts (lower end parts) of the main plate annular beads 2b, and the outer end part (lower end part) of the main plate outer peripheral bead 2c are indicated by one-dot-chain lines in FIG. 2. Further, the auxiliary plate 3 in the metal gasket assembly 1 in this embodiment, comprises auxiliary plate cylinder openings 3a formed corresponding to the main plate cylinder openings 2a in the main plate 2, that is, corresponding to the cylinder bores Sa in the cylinder block 5, fold-over parts 3b folded in the outer peripheral parts of the auxiliary cylinder openings 3a in a direction reverse to the direction toward the main plate 2 (the downward direction in FIG. 1), having a width with which they are vertically lapped at least with the entire 'V' shape of the main plate annular beads 2b on the main plate 2, auxiliary plate annular beads 3c formed on the fold-over parts 3b so as to be opposed to the main plate annular beads 2b on the main plate 2, projected in a direction reverse to the projecting direction of the main plate annular beads 2b, that is, the upward direction in this embodiment, and having a cross-sectional shape of 'V', a plurality of auxiliary plate coolant holes 3e formed corresponding to the plurality of the main plate coolant holes 2d in the main plate 2, and an auxiliary plate outer peripheral bead 3d opposed to the main plate outer peripheral bead 2c on the main plate 2 and having a cross-sectional shape of slope so as to be inclined in a direction reverse to the inclined direction of the main plate outer peripheral bead 2c, that is, the direction in which it is raised outward (leftward in the figure) of the gasket assembly in this embodiment, and further comprises auxiliary plate bolt holes 3f and auxiliary plate lubrication oil holes 3g and the like corresponding to the main plate bolt holes 2e, the main plate lubrication oil holes 2f and the like.

Figure 1:
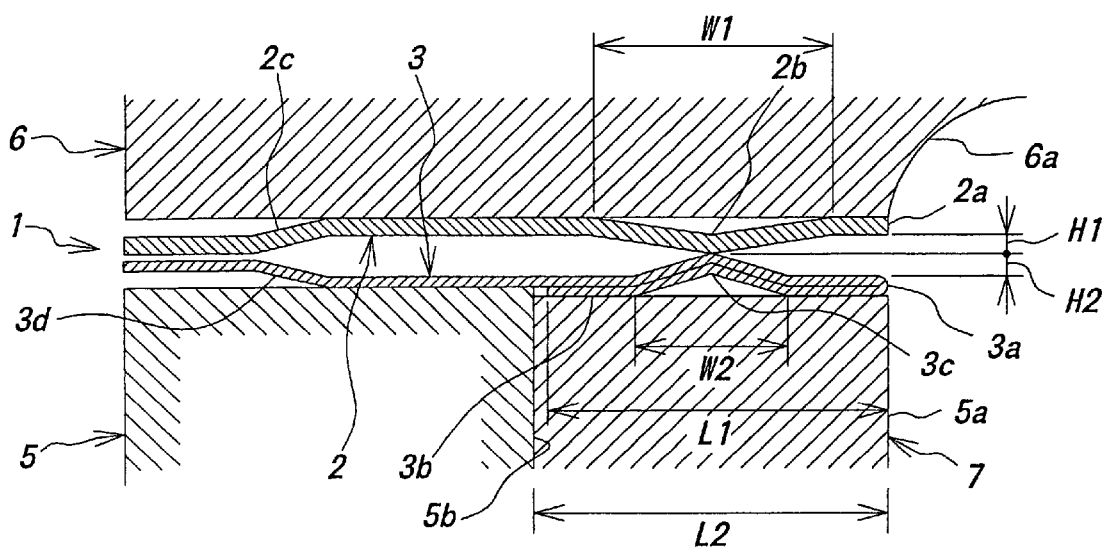
FIG. 1 is a sectional view along line A—A in FIG. 2, illustrating a first embodiment of a metal gasket assembly for a cylinder head according to the present invention.

In the metal gasket assembly I in this embodiment, as shown in FIG. 1, the width L1 of the fold-over parts 3b of the auxiliary plate 3 is slightly smaller than a thickness L2 of sleeves 7 made of e.g. cast iron and fitted in sleeve fitting holes 5b in the cylinder block 5 and defining the cylinder bores 5a, and further, the width W2 of the auxiliary plate annular beads 3c is set to be smaller than the width W1 of the main plate annular beads 2 while the height H2 of the auxiliary plate annular beads 3b is set to be higher than the height Hi of the main plate annular beads 2b.

The metal gasket assembly 1 in this embodiment is interposed between the cylinder block 5 and the cylinder head 6 of the gasoline engine, and is fastened by the cylinder head mounting bolts, and accordingly, the main plate annular beads 2b having a 'V' cross-sectional shape, particularly corresponding to the cylinder bores 5a in the cylinder block 5, and the auxiliary plate annular beads 3c opposed to the main plate annular beads 2b and projected in a direction reverse to the direction of the projection of the annular beads 2b and having a 'V' cross-sectional shape can prevent combustion gas in combustion chambers which is defined by the cylinder bores 5a in the cylinder block 5, recessed parts 6a in the cylinder head 6 opposed to the cylinder bores 5a and the top parts of pistons, not shown, in the cylinder bores 5a, from blowing to the outside, and the main plate outer peripheral bead 2c surrounding the plurality of coolant holes 2d corresponding to coolant passages which are formed in the cylinder block 5 and the cylinder head 6 and mutually communicated, and the auxiliary plate outer peripheral bead 3d formed corresponding to the main plate outer peripheral bead 2c and entirely surrounding the plurality of coolant holes 3e formed corresponding to the plurality of main plate coolant holes 2d, can prevent coolant from leaking.

Further, in the metal gasket assembly 1 in this embodiment, the fold-over part 3b of the auxiliary plate 3 having the width L1 with which they are lapped with at least the entire 'V' shape of the main plate annular beads 2b on the main plate 2 increases the thickness of the auxiliary plate 3 at positions corresponding to the main plate annular beads 2b, and further, the auxiliary plate annular beads 3c on the fold-over parts 3b of the auxiliary plate 3 are lapped with the main plate annular beads 2b and are fastened together. Accordingly, the distribution of the surface pressure between the main plate annular beads 2b and the other parts of the main plate 2 can be suitably adjusted by suitably selecting the thickness of the auxiliary plate 3, and accordingly, it is possible to enhance the sealing function of the main plate annular beads 2b and to allow the auxiliary plate annular beads 3c themselves to exhibit a high sealing function.

Accordingly, with the metal gasket assembly 1 in this embodiment, the sealing functions of the main plate outer peripheral beads 2c and the auxiliary plate outer peripheral beads 3d can be ensured so as to prevent coolant from leaking while the sealing functions of the main plate annular beads 2b and the auxiliary plate annular beads 3c can be enhanced so as to effectively prevent combustion gas from blowing out from the combustion chambers.

Further, in the metal gasket assembly 1 in this embodiment, since the fold-over parts 3b of the auxiliary plate 3 are formed being folded in a direction reverse to the direction toward the main plate 2, that is, in the downward direction, and since the width L1 of the fold-over parts 3b is slightly smaller than the thickness L2 of the sleeves 7 which are fitted in the sleeve fitting holes 5b of the cylinder block 5 so as to define the cylinder bores 5a, the fold-over parts 3b of the auxiliary plate 3 can be prevented from being caught between the upper end surface of the cylinder block 5 and the lower end surface of the cylinder head 6, but are located being opposed to the upper end surfaces of the sleeves 7 when the metal gasket assembly 1 is interposed between the cylinder block 5 and the cylinder head 6, and accordingly, the fold-over parts 3b do not cause the fastening of the metal gasket assembly 1 on the upper end surfaces of the sleeve 7 to be hindered, and the fold-over parts 3b do not cause the flat part of the auxiliary plate 3 to be forcibly deformed by a difference in height between the upper end surface of the cylinder block 5 and the upper end surfaces of the sleeves 7 so as to hinder the fastening of the metal gasket assembly 1, even though the sleeves 7 is depressed.

Accordingly, with the metal gasket assembly 1 according to the present invention, even though the sleeves 7 are depressed with respect to the upper surface of the cylinder block 5, the sealing function between the main plate annular beads 2b and the auxiliary plate annular beads 3c can be sufficiently enhanced, thereby it is possible to surely prevent combustion gas from blowing out from the combustion chamber.

Further, in the metal gasket assembly 1 in this embodiment, since the width W2 of the auxiliary plate annular beads 3c is smaller than the width W1 of the main plate annular beads 2b, and since the height H2 of the auxiliary plate annular beads 3c is higher than the height H1 of the main plate annular beads 2b, with the auxiliary plate annular beads 3c having the smaller width and the higher height, the slope of the beads 3c is steeper than that of the auxiliary plate annular beads having a width and a height equal to those of the main plate annular beads 2b, and accordingly, the auxiliary plate annular beads 3c can hardly be depressed, thereby it is possible to enhance the sealing functions of the main plate annular beads 2b and the auxiliary plate annular beads 3c.

Figure 2:
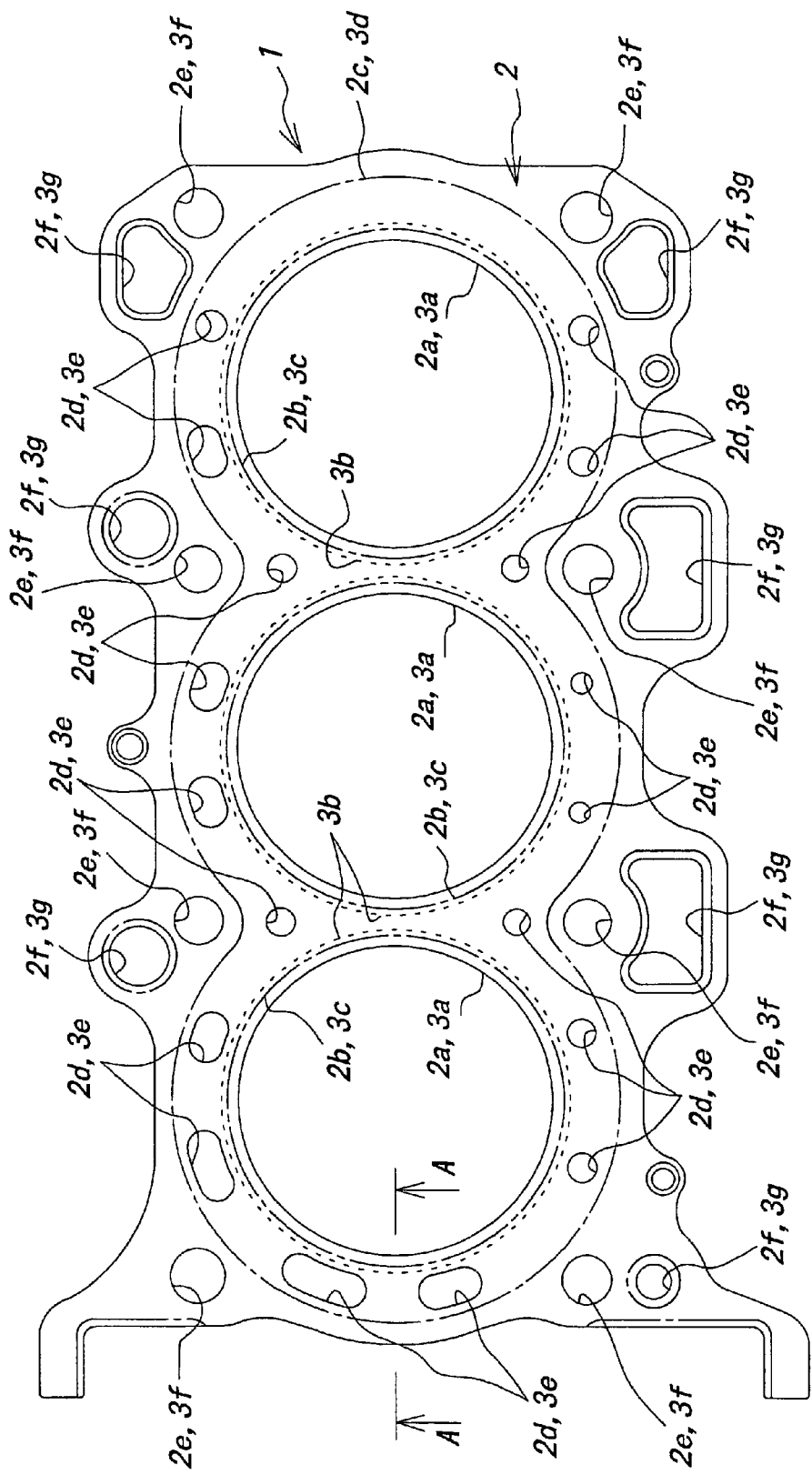
FIG. 2 is a plan view illustrating the metal gasket assembly shown in FIGS. 1 and 3.
Figure 3:
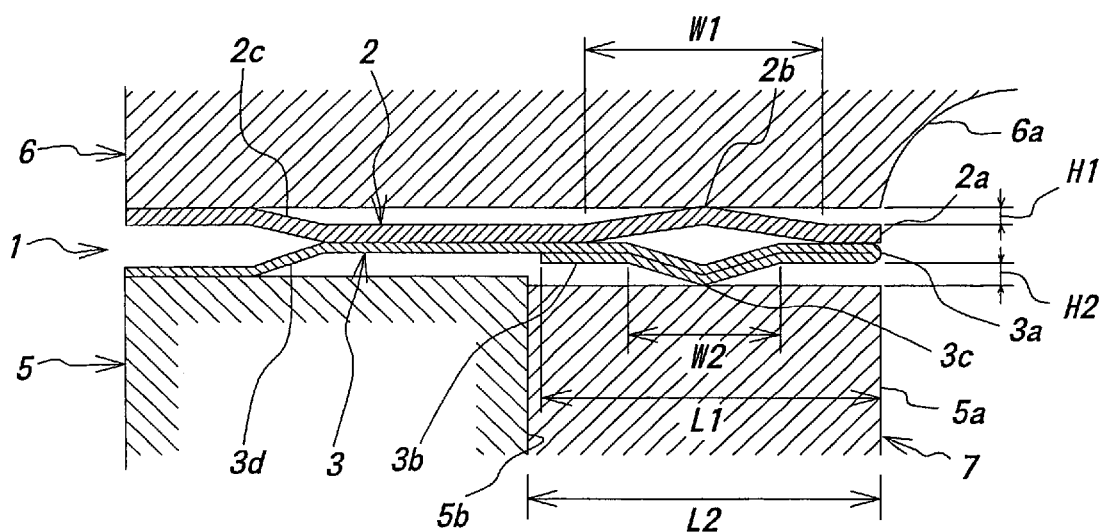
FIG. 3 is a sectional view along line A—A in FIG. 2, illustrating a second embodiment of a metal gasket assembly for a cylinder head according to the present invention.

FIG. 3 is a sectional view along line A—A in FIG. 2, which shows the second embodiment of the metal gasket assembly according to the present invention.

The metal gasket assembly 1 in the second embodiment is the same as that of the metal gasket assembly 1 in the first embodiment, except that the projecting directions of the main plate annular beads 2b and the auxiliary plate annular beads 3c are reverse to those in the first embodiment, and that the projecting directions of the main plate outer peripheral bead 2c and the auxiliary plate outer peripheral bead 3c are reverse to those in the first embodiment. The metal gasket assembly 1 in this second embodiment can also exhibit advantages similar to those obtained by the first embodiment.

Although the present invention has been explained in the form of the preferred embodiments, the present invention should not be limited to these embodiments. For example, one or both of the width and the height of the auxiliary plate annular beads 3c is/are set to be equal to one or both of those of the main plate annular beads 2b although the width of the auxiliary plate annular beads 3c is set to be smaller than that of the main plate annular beads 2b while the height of the former is set to be lower than that of the latter in the above-mentioned embodiment.

What is claimed is:

1. A metal gasket assembly comprising a metal main plate, and a metal auxiliary plate mutually lapped with the main plate, said main plate including main cylinder openings formed at positions corresponding to cylinder bores in a cylinder block of an internal combustion engine, main plate annular beads formed around the main plate cylinder openings and having a cross-sectional shape of 'V', a plurality of main plate coolant holes formed in the peripheral parts of the main plate annular beads, a main plate outer peripheral bead formed at a position where it entirely surrounds the main plate annular beads and the plurality of main plate coolant holes, and having a cross-sectional shape of slope, and the auxiliary plate including auxiliary plate cylinder openings formed corresponding to the main plate cylinder openings in the main plate, fold-over parts formed around the auxiliary plate cylinder openings and folded in a direction reverse to the direction toward the main plate, and having a width with which they are vertically lapped at least with the entire 'V' shape of the main plate annular beads on the main plate, auxiliary plate annular beads formed in the fold-over parts so as to be opposed to the main plate annular beads on the main plate and projected in a direction reverse to the direction of the projection of the main plate annular beads, and having a cross-sectional shape of 'V', a plurality of auxiliary plate coolant holes formed corresponding to the plurality of main plate coolant holes in the main plate, and an auxiliary plate outer peripheral bead opposed to the main plate outer peripheral bead and inclined in a direction reverse to the inclined direction of the main plate outer peripheral bead, and the width of the fold-over parts of the auxiliary plate being equal to or smaller than the thickness of sleeves which are fitted in sleeve fitting holes in the cylinder block and which define the cylinder bores.

2. A metal gasket assembly as set forth in claim 1, wherein the width of said auxiliary plate annular beads is set to be smaller than the width of the main plate annular beads.

3. A metal gasket assembly as set forth in claim 1, wherein the height of said auxiliary plate annular beads is set to be higher than the height of the main plate annular beads.

* * * * *